US009677875B2

(12) United States Patent
Hermans et al.

(10) Patent No.: US 9,677,875 B2
(45) Date of Patent: Jun. 13, 2017

(54) MEASURING SURFACE CURVATURE (71) Applicant: UCL Business PLC, London (GB)

(72) Inventors: Rodolfo Hermans, London (GB); Gabriel Aeppli, London (GB)

(73) Assignee: UCL Business PLC, London (GB)

( * ) Notice: Subject to any disclaimer, the term of this patent is extended or adjusted under 35 U.S.C. 154(b) by 0 days.

(21) Appl. No.: 14/388,310

(22) PCT Filed: Mar. 28, 2013

(86) PCT No.: PCT/GB2013/050835
§ 371 (c)(1),
(2) Date: Sep. 26, 2014

(87) PCT Pub. No.: WO2013/144646
PCT Pub. Date: Oct. 3, 2013

(65) Prior Publication Data
US 2015/0059026 A1 Feb. 26, 2015

(30) Foreign Application Priority Data
Mar. 28, 2012 (GB) .................................. 1205491.2

(51) Int. Cl.
*G01B 11/24* (2006.01)
*G01Q 20/02* (2010.01)
*G01S 17/02* (2006.01)
*G01B 11/255* (2006.01)

(52) U.S. Cl.
CPC .......... *G01B 11/24* (2013.01); *G01B 11/2441* (2013.01); *G01B 11/255* (2013.01); *G01S 17/026* (2013.01); *G01Q 20/02* (2013.01)

(58) Field of Classification Search
CPC ... G01B 11/255; G01B 11/2441; G01B 11/24; G01S 17/026; G01Q 20/02
USPC .......... 356/600–625, 511, 512; 435/5, 6, 29, 435/419
See application file for complete search history.

(56) References Cited

U.S. PATENT DOCUMENTS

| 4,880,991 | A | 11/1989 | Boehnlein et al. |
| 7,298,468 | B2 | 11/2007 | Hofbauer |
| 8,194,240 | B1 * | 6/2012 | Vaez-Iravani ...... G01B 11/0608 356/124 |
| 8,300,221 | B2 * | 10/2012 | Cho ...................... B82Y 35/00 356/365 |
| 8,451,457 | B2 * | 5/2013 | Gates ................. G02B 27/0075 250/216 |

(Continued)

FOREIGN PATENT DOCUMENTS

JP 2008-292438 A 12/2008
WO WO 2008/129272 A1 10/2008

OTHER PUBLICATIONS

International Search Report and Written Opinion for Application No. PCT/GB2013/050835 mailed Sep. 30, 2013.

*Primary Examiner* — Sang Nguyen
(74) *Attorney, Agent, or Firm* — Wolf, Greenfield & Sacks, P.C.

(57) ABSTRACT

A method of measuring surface curvature comprises forming an intensity distribution defined by Fresnel diffraction, wherein said intensity distribution is formed by electromagnetic radiation reflected from a surface, obtaining data for the intensity distribution and determining information relating to the curvature of the surface using the obtained data.

23 Claims, 9 Drawing Sheets (56) References Cited

U.S. PATENT DOCUMENTS

| | | | |
|---|---|---|---|
| 2002/0113790 A1* | 8/2002 | Hayashi | G06T 17/00 345/426 |
| 2003/0067609 A1 | 4/2003 | Morita | |
| 2004/0058335 A1* | 3/2004 | Su | C12Q 1/6825 435/6.19 |
| 2007/0041024 A1* | 2/2007 | Gao | G01D 5/28 356/616 |
| 2007/0064247 A1* | 3/2007 | Petit | G01B 11/0616 356/625 |
| 2007/0236701 A1* | 10/2007 | Neal | A61B 3/1005 356/512 |
| 2009/0325816 A1* | 12/2009 | Mirkin | B82Y 10/00 506/15 |
| 2010/0099984 A1* | 4/2010 | Graser | G01B 11/24 600/425 |
| 2010/0241396 A1* | 9/2010 | Rodenburg | A61B 6/483 702/167 |
| 2011/0039255 A1* | 2/2011 | Mertens | G01N 33/54373 435/5 |
| 2012/0010850 A1 | 1/2012 | Nakauchi et al. | |
| 2012/0140243 A1* | 6/2012 | Colonna de Lega | A61F 9/00836 356/609 |

* cited by examiner

Different observation distances b)

Different slit width

MEASURING SURFACE CURVATURE

RELATED APPLICATIONS

This application is a U.S. National Stage application based on International Application No. PCT/GB2013/050835, filed Mar. 28, 2013, which claims priority to United Kingdom Application No. 1205491.2, filed Mar. 28, 2012, which are incorporated herein by reference in their entirety.

FIELD

This disclosure relates to measuring surface curvature. In particular, but not exclusively, it relates to measuring the curvature of a surface of a microstructure such as a micro-cantilever.

BACKGROUND

Micro-cantilevers find use in many applications. For example, the atomic force microscope has for some time used deflection of a micro-cantilever to measure the force between the cantilever tip and the sample. More recently, arrays of micro-cantilevers have been used as biosensors. It has been shown that when biochemically specific interactions occur between a ligand immobilized on one side of a micro-cantilever and a receptor in solution, the micro-cantilever bends, which can be detected optically.

International patent application WO02008129272 describes an apparatus for measuring changes in shape of tethered or untethered cantilevers. As described, a Fraunhofer interference pattern is formed by light transmitted through or reflected from a cantilever. Changes in the shape of peaks and/or troughs in the interference pattern relative to the interference pattern for an undistorted cantilever are analysed to obtain information about changes in the cantilever shape.

SUMMARY

The present disclosure provides a method of measuring surface curvature, comprising: forming an intensity distribution defined by Fresnel diffraction, wherein said intensity distribution is formed by electromagnetic radiation which has been reflected from a surface; obtaining data for the intensity distribution; and determining information relating to the curvature of the surface using the obtained data.

Preferably, determining information relating to the curvature of the surface comprises determining an absolute value for a curvature parameter in fundamental units (e.g: $nm^{-1}$).

In embodiments, the method comprises forming an image, wherein the image comprises the intensity distribution. The image may be formed on a detector.

The image is preferably a defocused image of the surface. The defocused image may be formed by refracting (e.g: using a refracting element such as a lens) electromagnetic radiation which has been reflected from the surface. Alternatively, the defocused image may be formed using one or more curved mirrors.

According to embodiments, the deviation from focus is selected so that the image does not overlap or does not substantially overlap with other images. For example, the deviation from focus may be selected so that the defocused image for the surface does not overlap with images for other surfaces, e.g: surfaces of neighbouring objects.

In embodiments the image is "focused enough" to avoid overlap with other images, thereby to substantially avoid the presence of coupled information from other illuminated surfaces or objects, but also "defocused enough" so that Fresnel diffraction results in an image from which information relating to the curvature of the surface can be obtained.

In embodiments, the image is a mapping of the intensity distribution formed in space at a distance z from the surface. If a screen were placed at this distance, a Fresnel diffraction pattern would be formed on the screen. Thus, in embodiments, the image formed on the detector comprises an image of a Fresnel diffraction pattern.

According to various embodiments, the image is formed by illuminating the surface with electromagnetic radiation and reflecting electromagnetic radiation from the surface. In embodiments, the intensity distribution is formed by electromagnetic radiation reflected from a plurality of different points along the non-planar surface In embodiments, obtaining data for the intensity distribution comprises obtaining image data for the image. In embodiments, obtaining image data for the image comprises capturing the image with a detector.

The curvature of the surface can be described by one or more curvature parameters, which provide a measure of the extent to which the surface deviates from being flat.

Determining information relating to the curvature of the surface may comprise determining one or more of said curvature parameters. In embodiments, one or more curvature parameters comprising one or more polynomial terms for the surface shape may be determined.

In embodiments, determining information relating to the curvature of the surface comprises determining a second order polynomial term for the cantilever shape. Alternatively, or in addition, determining information relating to the curvature of the surface may comprise determining third and/or fourth order or higher order polynomial terms for the curvature of the surface.

Determining information relating to the curvature of the surface may comprise processing the obtained data to calculate a figure of merit indicative of the size of the image in at least one dimension, and determining information relating to the curvature of the surface using the calculated figure of merit.

The calculated figure of merit may be used to determine a scaling factor for the image using information relating to the physical size of the surface in at least one dimension. Information relating to the curvature of the surface may be obtained by comparing the measured scaling factor with a predetermined formula for the scaling factor. In embodiments, the predetermined formula for the scaling factor is 1+bz, where b is a curvature parameter.

The electromagnetic radiation may be visible, ultra-violet or infrared light. The electromagnetic radiation may be produced by a single source, e.g: a laser source. The electromagnetic radiation may comprise a laser beam. The spatial intensity profile of the laser beam in a plane transverse to the beam propagation may be substantially flat in a central region of the beam.

In some embodiments, the electromagnetic radiation may comprise radiowaves, microwaves, infrared, x-rays, or other electromagnetic radiation.

In embodiments, the surface is a continuous surface. The surface may be substantially parabolic.

In embodiments, the curvature of a surface of a microelectromechanical system (MEMS) may be measured. In embodiments, the curvature of a surface of another microstructure or nanostructure, may be measured.

In embodiments, the surface is a continuous surface of a single object (e.g: a continuous surface of a single microstructure such as a micro cantilever).

In embodiments, the surface is a surface of a curved cantilever such as a curved micro cantilever. Preferably, the surface is a major surface of a curved cantilever. Thus, in embodiments, the curvature of a cantilever may be measured.

In embodiments, the curved cantilever is adapted so that it may be caused to adopt a flat shape. The surface under measurement may have a generally rectangular shape when the cantilever is flat. The cantilever preferably has a thickness which is smaller than its length or its width. Thus, a cantilever may have the shape of a beam when flat.

A curved cantilever may comprise a curved beam. When curved, the major surfaces of the cantilever are non-planar.

The length of the cantilever may be 500 µm or less, 250 µm or less, 200 µm or less, 150 µm or less, 100 µm or less, or 50 µm or less. Alternatively, in some embodiments, the cantilever may be longer than 500 µm.

The cantilever may be one of a plurality of cantilevers in a cantilever array. The method may comprise illuminating said plurality of cantilevers. The method may comprise illuminating the entire array.

Alternatively, in some embodiments, only one cantilever is illuminated. Thus, in some embodiments, a single object (e.g: a single microstructure such as a cantilever) is illuminated at any one time.

The method may comprise forming defocused images for some or each cantilever in the array. In embodiments, the images are formed so that there is no substantial overlap between the images for individual cantilevers.

In embodiments, the value of z is less than 100 mm from the surface. The value of z may be less than 95 mm, less than 24 mm, less than 15 mm, less than 9 mm, less than 4 mm or less than 1 mm.

In embodiments, one end of the major surface of the curved cantilever is lower than the other by a distance of less than 1% of the cantilever length. In some embodiments, one end of the major surface of the curved cantilever is lower than the other by a distance of less than 0.1% of the cantilever length.

The present disclosure also provides a method of measuring the curvature of non-planar surfaces, comprising: forming a first diffraction image, wherein said first diffraction image is formed by electromagnetic radiation which has been reflected from a first surface; forming a second diffraction image, wherein said second diffraction image is formed by electromagnetic radiation which has been reflected from a second surface, wherein the first and second diffraction images are formed concurrently; obtaining data for the first and second diffraction images; determining information relating to the curvature of the first and second surfaces using the obtained data, wherein the first and second diffraction images do not substantially overlap with one another.

The first surface may be a surface of a first cantilever, and the second surface may be a surface of a second cantilever. The first and second cantilevers may be members of a cantilever array. The method may comprise forming an out of focus image of the array, wherein the out of focus image of the array includes the first image and the second image.

This disclosure also provides an apparatus for measuring the curvature of a non-planar surface, comprising: an optical arrangement to form an intensity distribution defined by Fresnel diffraction, wherein said intensity distribution is formed by electromagnetic radiation reflected from a surface; a detector to obtain data for the intensity distribution; and a processor to determine information relating to the curvature of the surface using the obtained data.

In embodiments, the apparatus further comprises a projection system to illuminate the surface with electromagnetic radiation such that electromagnetic radiation is reflected from the surface.

In embodiments, the optical arrangement comprises an image forming arrangement to form an image comprising the intensity distribution. The image forming arrangement may comprise one or more lenses arranged to form the image by refracting light reflected from the surface. Alternatively, or in addition, the image forming arrangement may comprise one or more curved mirrors so as to create the image.

As used herein, the term "optical arrangement" includes arrangements to form an intensity distribution with electromagnetic radiation of any suitable kind, e.g: visible, ultraviolet or infrared light.

As is well understood by those skilled in the art, Fresnel diffraction refers to diffraction which occurs when $F \geq 1$, where F is the Fresnel number for the optical arrangement. This contrasts with the condition for Fraunhofer diffraction, which is that $F \ll 1$. In the art, Fresnel diffraction is alternatively and equivalently termed "near field" diffraction. Fraunhofer diffraction, on the other hand, is alternatively and equivalently termed "far field" diffraction.

In some embodiments of the present invention, $F \geq 1$. In some embodiments, $F > 1$.

This disclosure also provides a method of processing image data in which the image data represents an image formed by electromagnetic radiation which has been reflected from a plurality of non-planar surfaces, comprising: identifying a plurality of regions in the image, each region comprising a sub-image corresponding to a single one of said surfaces; calculating a figure of merit indicative of the size of each sub-image in at least one dimension; and determining information relating to the curvature of at least one surface using the figure of merit.

Identifying a plurality of regions in the image may comprise: processing the image data to align sub-images for each surface; obtaining a histogram of intensity per pixel column and identifying said plurality of regions using the histogram.

This disclosure also provides computer readable medium comprising instructions which enable a processor to cause the method to be carried out.

This disclosure also provides an apparatus comprising one or more processing units configured to cause the method to be carried out.

This disclosure also provides a method of measuring surface curvature, comprising forming an image, wherein forming said image comprises diffraction of electromagnetic radiation which has been reflected from a non-planar surface, determining a scaling factor for the image, and measuring the curvature of the surface by comparing the scaling factor with a predetermined formula. In embodiments, the predetermined formula for the scaling factor is $1+bz$, where b is a curvature parameter and z is the distance over which said diffraction occurs.

This disclosure also provides a method of measuring surface curvature, comprising forming a focussed image of the surface, obtaining image data for the focussed image, forming a defocused image of the surface, obtaining image data for the defocused image, and determining information relating to the curvature of the surface using the image data obtained for the focussed image and the image data obtained for the defocused image.

BRIEF DESCRIPTION OF THE DRAWINGS

In order that the invention of this disclosure may be more fully understood, embodiments thereof will now be described by way of example only, with reference to the accompanying figures, in which.

DETAILED DESCRIPTION

Figure 1:
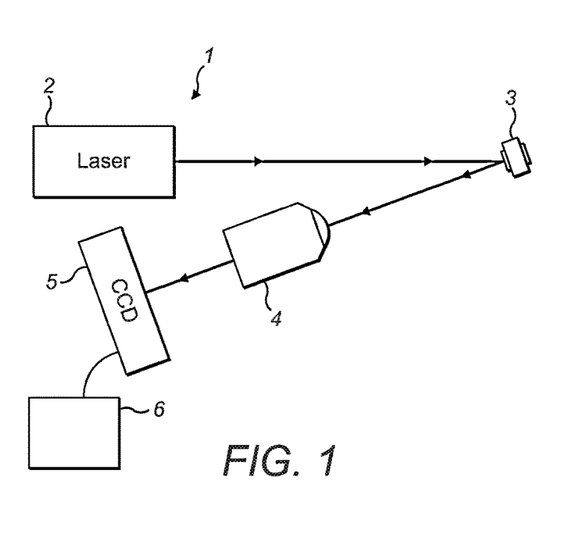
FIG. 1 illustrates an apparatus for measuring surface curvature.

FIG. 1 shows an apparatus 1 for measuring surface curvature according to an embodiment of the present invention. As shown, the apparatus 1 includes a light source in the form of a laser 2, which is arranged to illuminate a sample 3 comprising an array of cantilevers (e.g: micro-cantilevers). As shown, light reflected from the sample 3 passes through a lens 4 such as a microscope objective. The lens 4 is arranged to refract the light to form an image on a detector 5, which includes a plurality of pixels for capturing an image. The detector 5 may comprise a charge-coupled device (CCD) or complementary metal-oxide-semiconductor (CMOS) detector or another suitable detector for measuring the intensity distribution of the image. The apparatus also includes a calculating component in the form of a computing device 6, which is configured to receive and process image data obtained by the detector 5.

In embodiments, the position of the sample 3 is chosen so that the distance between the sample 3 and lens 4 is slightly greater (by an amount z) than the distance required to form a focussed image of the sample 3 on the detector 5. In this way, a slightly defocused image of the cantilever array 3 is formed on the detector 5. The distance z is chosen so that there is substantially no overlap between individual cantilevers in the array.

Those skilled in the art cognizant of the present disclosure will appreciate that the intensity distribution of the defocused image is a mapping of the intensity distribution which would be measured at distance z from the sample. This intensity distribution is formed by Fresnel (ie: near field) diffraction of light reflected from each cantilever surface. Accordingly, the image which is formed on the detector is a Fresnel diffraction image, ie: it comprises an intensity distribution defined by Fresnel diffraction.

It has been found that due to Fresnel diffractive effects, the length of the defocused image for each cantilever provides a measure of the surface curvature of the cantilever.

Figure 2:
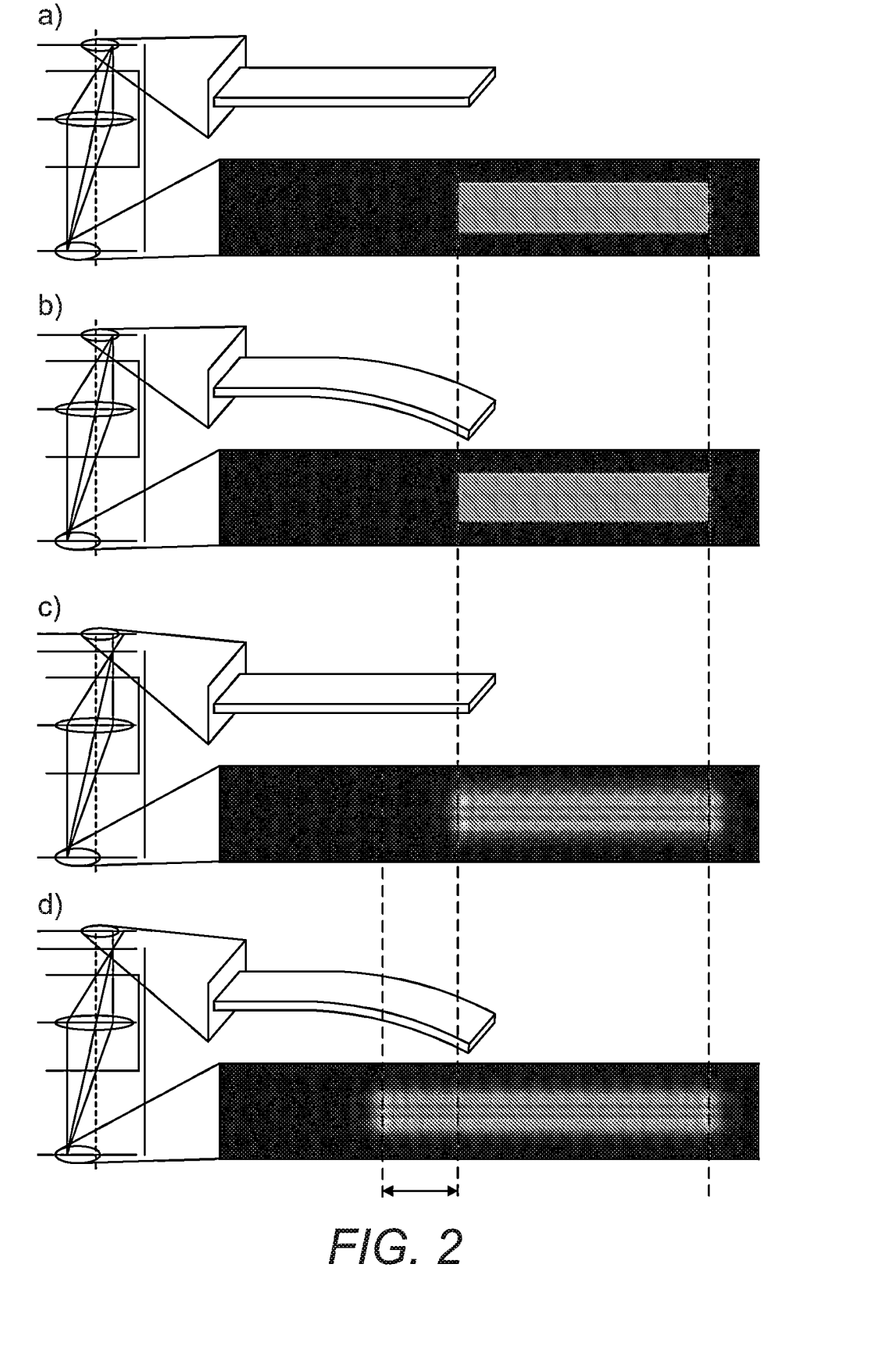
FIG. 2(a) shows an in-focus image formed by a cantilever with zero curvature.
FIG. 2(b) shows an in-focus formed by a cantilever with significant curvature.
FIG. 2(c) shows an out-of-focus image formed by a cantilever with zero curvature.
FIG. 2(d) shows an out-of-focus image formed by a cantilever with significant curvature.

This is illustrated in FIG. 2, which shows examples of images at z=0, ie: "focussed cantilevers" and z>0, ie: "out-of-focus cantilevers". In particular, FIGS. 2(a) and 2(b) show "in-focus" images for a cantilever with zero curvature and non-zero curvature respectively, while FIGS. 2(c) and 2(d) show "out-of-focus" images for a cantilever with zero curvature and non-zero curvature respectively. As can be seen in FIG. 2(d), the curvature of the cantilever generates a significant change in the size of the observed pattern.

To measure the curvature, the computing device processes the data obtained from the detector to identify images for individual cantilevers and calculates a value for the length of the defocused image for each cantilever.

Thus, according to embodiments of the present invention, the curvature of all of the cantilevers in the array can be measured in a single measurement. Since there is no overlap between the individual images, cross-talk is avoided.

In some implementations, an absolute value for a curvature parameter can be calculated by comparing the measured length of the defocused image with the physical length of the cantilever when it is flat and has no curvature. The physical length of the flat cantilever may for example be known from the manufacturer specification, or it may be measured separately.

In some implementations, a curvature parameter may be calculated from the expression R=(1+4bz), where R is the ratio of the measured length of the defocused image to the known physical length of the cantilever when it is flat and has no curvature.

The apparatus 1 is tolerant to small misalignments and does not require aiming the illuminating light to special regions of the structure. Instead, the whole array may be illuminated to form an out-of-focus digital picture of the cantilevers.

An exemplary method of measuring curvature of an array of cantilevers with the apparatus 1 will now be described in more detail with reference to FIGS. 3-5.

Figure 3:
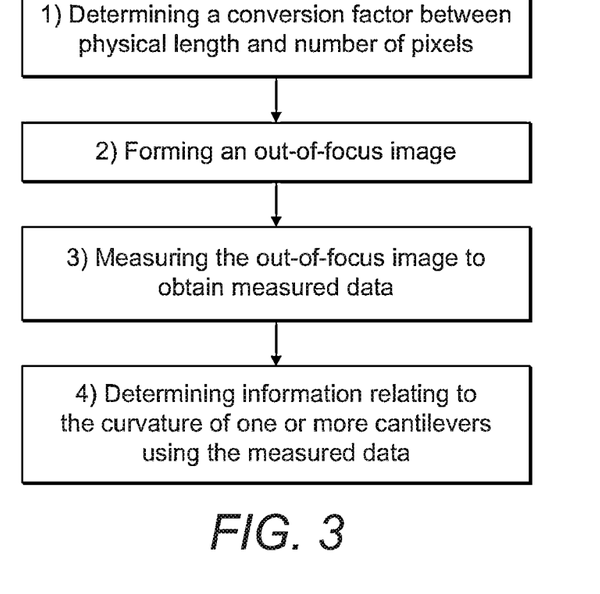
FIG. 3 illustrates steps of a method according to an embodiment of the invention.

The exemplary method of FIG. 3 comprises 1) determining a conversion factor between physical length and number of pixels, 2) forming an out-of-focus image of at least a part of the cantilever array 3) measuring at least a part of the out-of-focus image to obtain measured data; and 4) determining information relating to the curvature of one or more cantilevers using the measured data.

An exemplary method of determining a conversion factor between physical length and number of pixels according to step 1) of FIG. 3 will now be described.

First, the image forming arrangement is adjusted to bring the image of the cantilever array formed on the detector 5 into focus. The image is captured by the detector and the image size in pixels is determined. The number of pixels is then compared to known dimensions of the array to determine the conversion factor. Dimensions of the array may be known from manufacturer specification. For example, the cantilever array and the individual cantilevers may be manufactured by photolithography to have particular dimensions. Those skilled in the art will appreciate that the array dimensions may alternatively be measured in a separate measurement.

Other methods for determining a conversion factor between physical length and number of pixels are envisaged. In some implementations it is not necessary to know the size of the cantilever array or to measure the dimensions of a focussed image on the detector to determine the conversion factor. For example, the conversion factor can be calculated from the magnification factor of the microscope objective together with the physical length of a row of pixels and the number of pixels in a row. Thus, if these parameters are measured or known from manufacturer specification, the conversion factor can be determined by calculation.

Once the conversion factor is determined, the image-forming arrangement is adjusted to form an out-of-focus image of at least a part of the cantilever array on the detector, in accordance with step 2 of FIG. 3. This may be achieved by moving the sample 3 away from the lens 4 by a distance z. A calibrated translating stage may be provided to move the sample.

The out-of-focus image may be formed in other ways. For example, rather than moving the sample away from the lens by a distance z, alternatively, the sample may be moved closer to the lens by a distance z to form the out-of-focus image. Alternatively or in addition to moving the sample, a new media with known dimensions and refractive index may be introduced into the beam path. Alternatively, or in addition, the lens 4 may be interchanged with another lens of different focal length. Alternatively, or in addition, the lens or the CCD may be moved to provide the defocused image.

A calibrated translating stage may be provided to physically move the optical components. In some implementations the optical arrangement may be configured to provide different optical paths for in-focus and out-of-focus images, with different detectors for each image.

Next, in accordance with step 3 of FIG. 3, a measurement is made of at least a part of the out-focus image. In embodiments, this is achieved by capturing the out-of-focus with the detector 4, which sends image data for the image to the computing device 6.

Figure 4:
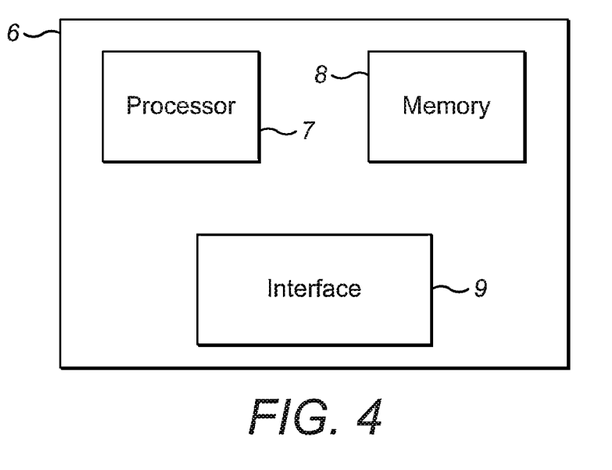
FIG. 4 is a block diagram illustrating aspects of the configuration of a computing device.

FIG. 4 is a block diagram illustrating some aspects of the configuration of the computing device 6. As shown, the computing device includes one or more processors 7, a memory 8, and an interface 9 for receiving data from the detector 5. The memory 8 may include volatile memory such as RAM, DRAM and/or non-volatile memory such as ROM, flash memory or a hard disk. The memory 8 stores computer readable instructions used in operating the computing device as well as other data, e.g: image data relating to images captured by the detector. The processor 7 operates under the control of the computer-readable instructions stored in the memory 8.

Figure 5:
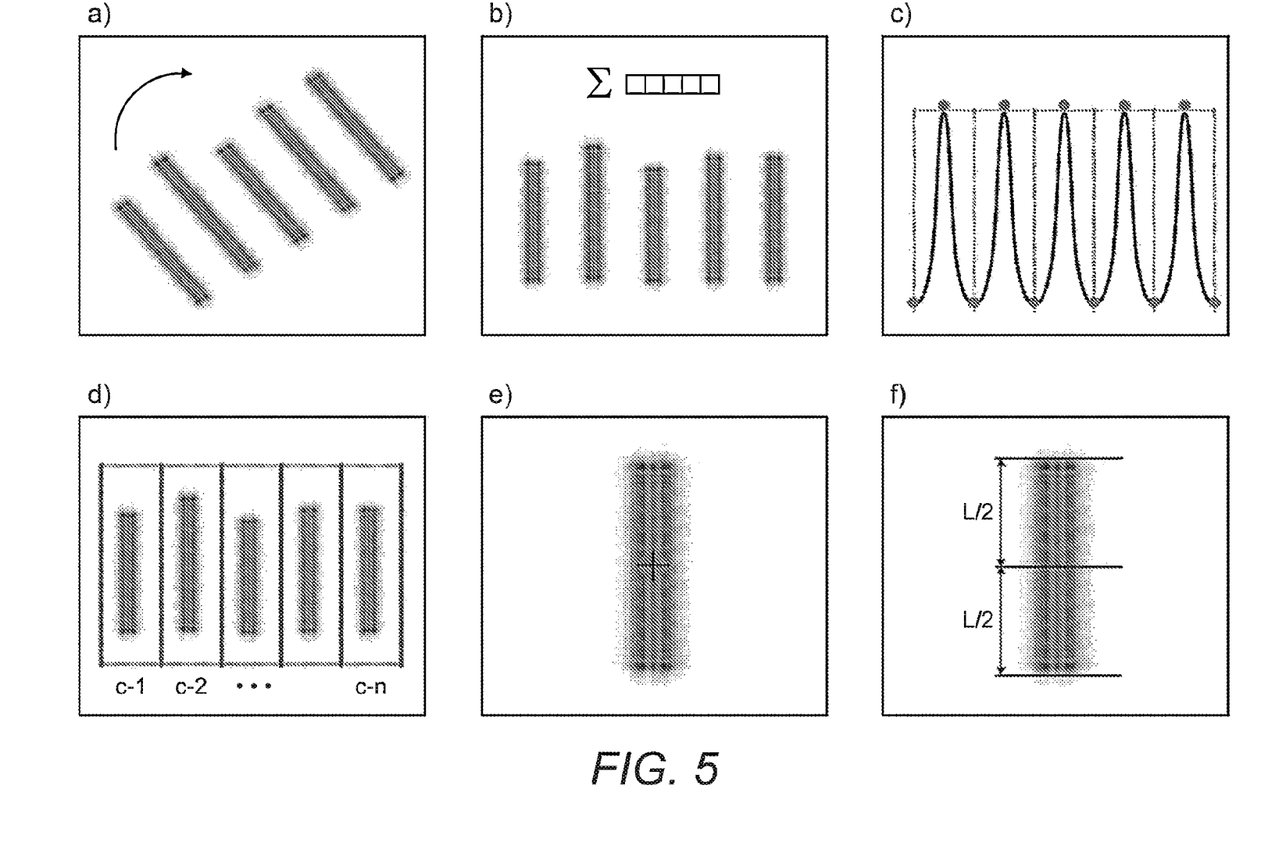
FIG. 5 illustrates an exemplary method of processing image data.

The computing device 6 is configured to process the measured image data for the out-of-focus image in order to determine information relating to the curvature of one or more cantilevers, in accordance with step 4 of FIG. 3, FIG. 5 illustrates an exemplary method of processing the image data to determine information relating to the curvature of one or more of the cantilevers.

As shown, in a first step 1, the captured image is rotated to align the digital image for each cantilever vertically. In step b, the array rows are summed to obtain a histogram of intensity per pixel column. In step c, maximum and minimum values of the histogram are found. In step d, the image area is divided into sub-regions for each cantilever, with boundaries are defined by the minimums of the histogram. In step e, centroids are calculated for each sub-region. In step f, length of the cantilever image is calculated from each centroid, using a predetermined formula.

A length may be calculated for each cantilever image by numerically implementing the following calculation:

$$W = \sqrt{\frac{3\int(x-\bar{x})^2 I(x)dx}{\int I(x)dx}}$$

Where $I(x)$ is the intensity at a position x along a longitudinal axis through the centroid of the cantilever image and $\bar{x}$ is the position of the centroid.

It will be appreciated that alternative figures of merit could be used to provide an indication of length. For example, the image could be processed to reduce its resolution to smooth out fine detail, and then a full width at half maximum (FWHM) of $I(x)$ calculated to provide an indication of length. Alternatively, a figure of merit could be obtained by binarising the image and counting the number of pixels above a threshold in intensity.

In embodiments, the length W is converted from units of pixels to units of physical length (e.g: mm) using the conversion factor determined in step 1 of FIG. 3. The computing device then calculates a value of curvature parameter b for each cantilever using the expression R=(1+4bz), where R is the ratio of the length W of the defocused image to the known physical length of the cantilever when it is flat and has no curvature. In this way, an absolute measurement of the cantilever curvature is obtained.

An analytical discussion of various aspects of the present disclosure will now be provided.

A1. Fresnel Diffraction of a Rectangular Slit

There is a well known solution for the Fresnel diffraction of a rectangular slit in the plane ($\xi$, $\eta$) that expresses the wave amplitude in the observing plane (x, y) as the convolution integral $$U(x, y) = \frac{e^{ikz}}{i\lambda z}\int\int_{-\infty}^{\infty} U(\xi, \eta)\exp\left\{i\frac{\pi}{\lambda z}[(x-\xi)^2 + (y-\eta)^2]\right\}d\xi d\eta. \quad (1.1)$$

where $U(\xi, \eta)$ is the function defining intensity at the source. For a rectangular slit the illuminated area is given by $$U(\xi, \eta) = rect\left(\frac{\xi}{2w}\right)rect\left(\frac{\eta}{2w}\right) \quad (1.2)$$

which inserted in equation 1.1 gives $$U(x, y) = \frac{e^{ikz}}{i\lambda z} \int\int_{-w}^{w} \exp\left\{i\frac{\pi}{\lambda z}[(x-\xi)^2 + (y-\eta)^2]\right\}d\xi d\eta. \quad (1.3)$$

Notice that $U(\xi, \eta)$ can be separated as the product of two functions $I(x)$ and $I(y)$ $$U(x,y) = -i\exp(ikz)I(x)I(y) \quad (1.4)$$

with $$I(x) = \frac{1}{\sqrt{\lambda z}} \int_{-w}^{w} \exp\left[i\frac{\pi}{\lambda z}(x-\xi)^2\right]d\xi \quad (1.5)$$

and $$I(y) = \frac{1}{\sqrt{\lambda z}} \int_{-h}^{h} \exp\left[i\frac{\pi}{\lambda z}(y-\eta)^2\right]d\xi \quad (1.6)$$

We now concentrate on a single dimension. Considering the definitions for the Fresnel Integrals $C(\alpha)$ and $S(\alpha)$ $$C(\alpha_i) = \int_0^{\alpha_i} \cos\left(\frac{1}{2}i\pi\alpha^2\right)d\alpha \quad (1.7)$$

$$S(\alpha_i) = \int_0^{\alpha_i} \sin\left(\frac{1}{2}i\pi\alpha^2\right)d\alpha \quad (1.8)$$

We use the change of variables $$\alpha = \sqrt{\frac{2}{\lambda 2}}(\xi - x)$$

together with the Fresnel Integrals in equation 1.5 to get the intensity in the x axis $$I(x) = \frac{1}{\sqrt{2}}[(C(\alpha_2) + C(\alpha_1)) + i(S(\alpha_2) + S(\alpha_1))] \quad (1.9)$$

Where $\alpha_i$ are the new integration limits. We obtain that the intensity at the observation plane is given by $I(x, y)=|U(x, y)|$, which for the x axis is $$I(x) = \frac{1}{2}((C(\alpha_2) - C(\alpha_1))^2 + (S(\alpha_2) - S(\alpha_1))^2) \quad (1.10)$$

Figure 6:
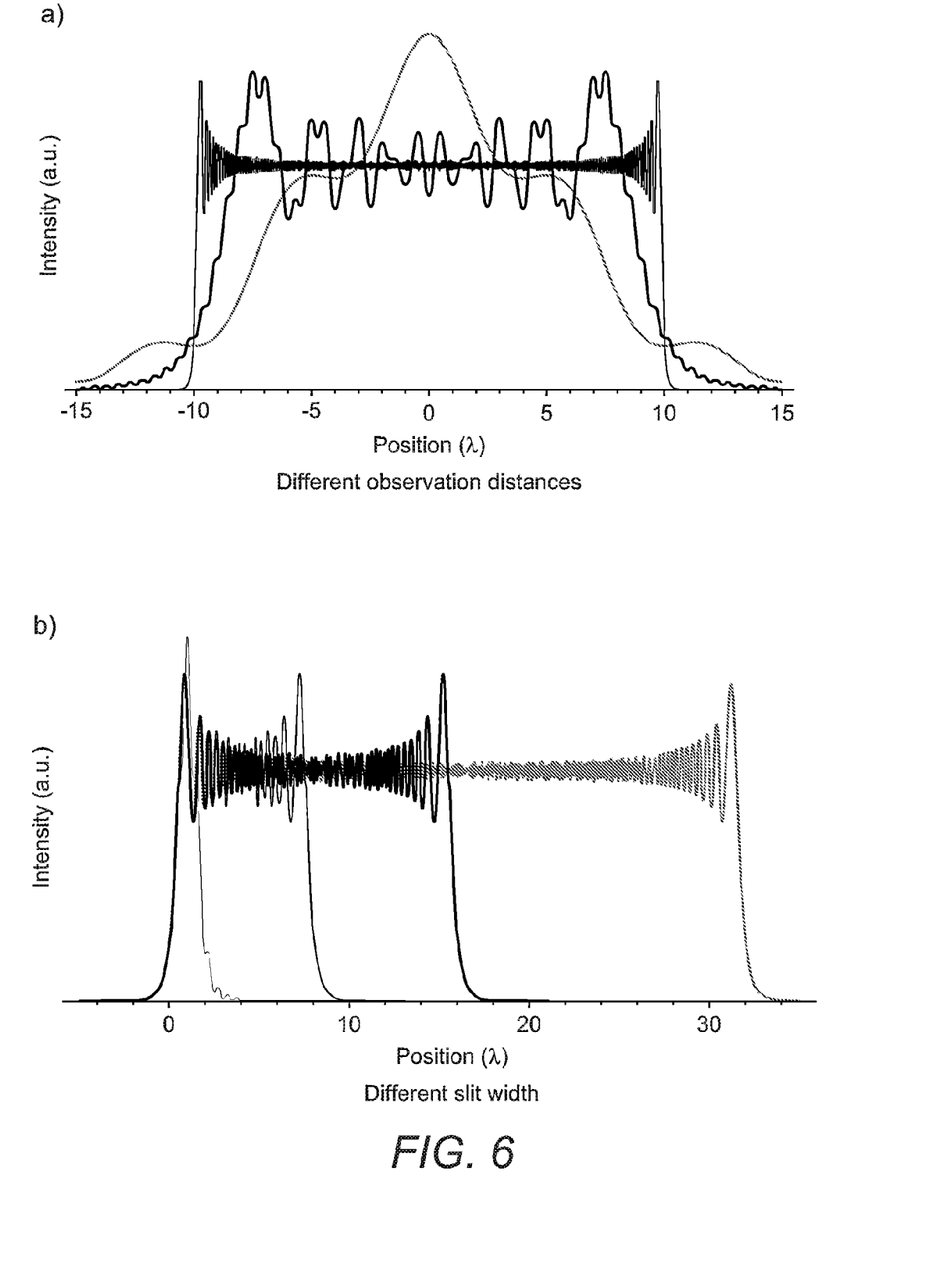
FIG. 6 illustrates Fresnel diffraction patterns for three different observation distances (a) and for four different slit widths (b)

FIG. 6 shows this solution for a) different observing distances and b) different slit widths. We can observe that when the observation distance is small compared with the slit size the observed pattern resembles the rectangular shape of the illuminated area but at long distances compared to slit size and wavelength the pattern stretches over all the space in a characteristic central zero order and symmetrically around a series of higher order lower intensity peaks.

A2 Fresnel Diffraction for a Curved Cantilever

Now we consider the case of a rectangular cantilever reflecting a plane homogeneous beam of light. If we assume a cantilever with a perfectly flat and smooth surface the light reflected from its surface is the same as that from a rectangular slit with the same dimensions. But if the cantilever is curved, there will be an extra distance traveled by the light equal to two times the normal displacement of the surface. We follow the same procedure described in the last section but with a modified function $U(\xi, \eta)$ featuring an extra phase $\phi$ created by the light needing to travel twice the shift in position caused by the curvature of the cantilever. For an exemplary parabolic displacement $z=a\xi+b\xi^2$ the extra phase is $$\phi = \frac{2\pi}{\lambda}[2(a\xi + b\xi^2)]$$

and we redefine $U(\xi, \eta)$ as $$U(\xi, \eta) = rect\left(\frac{\xi}{2w}\right)\exp\left(i\frac{4\pi}{\lambda}(a\xi + b\xi^2)\right)rect\left(\frac{\eta}{2w}\right) \quad (1.11)$$

obtaining $$U(x, y) = \frac{e^{ikz}}{i\lambda z} \quad (1.12)$$

$$\int\int_{-w}^{w} \exp\left\{i\frac{\pi}{\lambda z}[4a\xi z + 4b\xi^2 z + \xi^2 + x^2 - 2\xi x + (y-\eta)^2]\right\}d\xi d\eta.$$

Rearranging this equation by completing the squares, factoring for the binomial of $\xi$ and moving all the factors independent of $\xi$ or $\eta$ out of the integral, we obtain:

$$U(x, y) = \frac{\exp\left(ik\left(z + 4\frac{ax + bx^2 - a^2 z}{1 + 4bz}\right)\right)}{i\lambda z} \quad (1.13)$$

$$\int\int_{-w}^{w} \exp\left\{i\frac{\pi}{\lambda z}\left[(1+4bz)\left(-\frac{x - 2az}{1 + 4bz} + \xi\right)^2 + (y - \eta)^2\right]\right\}d\xi d\eta.$$

The expression for the y axis does not change from the last solution so we focus on the x axis and again separating variables $U(x, y) = -i\exp(ikz)I(x)I(y)$ with $$I(x) = \quad (1.14)$$

$$\frac{\exp\left(4ik\frac{ax + bx^2 - a^2 z}{1 + 4bz}\right)}{\sqrt{\lambda z}} \int_{-w}^{w} \exp\left\{i\frac{\pi(1+4bz)}{\lambda z}\left(-\frac{x - 2az}{1 + 4bz} + \xi\right)^2\right\}d\xi$$

and the change of variable given by $$\alpha = \sqrt{\frac{2 + 8bz}{\lambda z}}\left(-\frac{x - 2az}{1 + 4bz} + \xi\right). \quad (1.15)$$

we obtain $$I(x) = \frac{\exp\left(4ik\frac{ax+bx^2-a^2z}{1+4bz}\right)}{\sqrt{2+8bz}} \int_{\alpha_1}^{\alpha_2} \exp\{i\frac{\pi}{2}\alpha^2\}d\alpha. \quad (1.16)$$

Using $I(x)=|U(x)|^2$ we obtain the observed intensity $$I(x) = \frac{1}{2+8bz}((C(\alpha_2)-C(\alpha_1))^2 + (S(\alpha_2)-S(\alpha_1))^2). \quad (1.17)$$

We can see that the solution is the same as before but with the x coordinate transformed by $$x'=2az+(1+4bz)x \quad (1.18)$$

and the intensity scaled by $(1+4bz)^{-1}$. We now review the interpretation of this result.

A2.1 Tilted Cantilever

Figure 7:
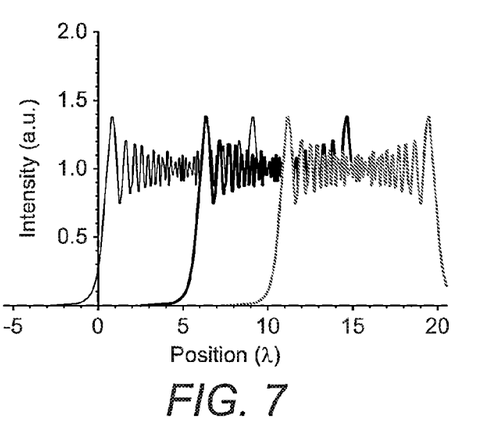
FIG. 7 shows diffraction patterns for cantilevers with different tilts.

If the cantilever is tilted at an angle θ but not curved, then $z=a\xi+b\xi^2$ with b=0 and a=sin(θ). In consequence x'=2 sin(θ)z+x, or in words, the pattern position is shifted by a distance equal to 2 z sin(θ), similar (for small angles) to the shift expected from geometric optics z sin(2θ). This is illustrated in FIG. 7. In this way, the pattern position shift can be used to measure changes in tilt of the cantilever.

A2.2 Curved Cantilever

Figure 8:
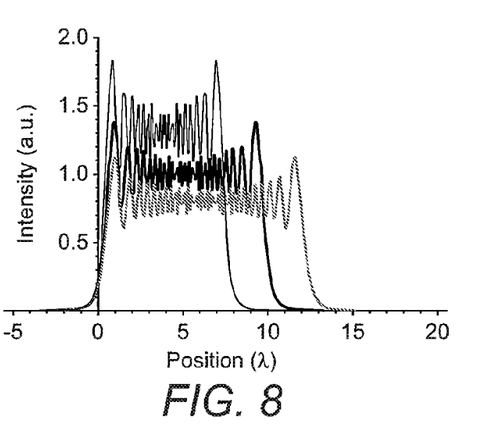
FIG. 8 shows Fresnel diffraction patterns for different curvatures.

If the cantilever is curved but not tilted, then $z=a\xi+b\xi^2$ with a=0 and the parameter b≠0. In consequence, x'=(1+4bz)x or in words the pattern is scaled by (1+4bz), which will be referred to herein as the scaling factor S. This is to first order the magnification expected in geometric optics for a similarly curved mirror. The total intensity of light is conserved so the pattern intensity is scaled down by the same factor $(1+4bz)^{-1}$. This is illustrated in FIG. 8.

A3 Figure of Merit

Figure 9:
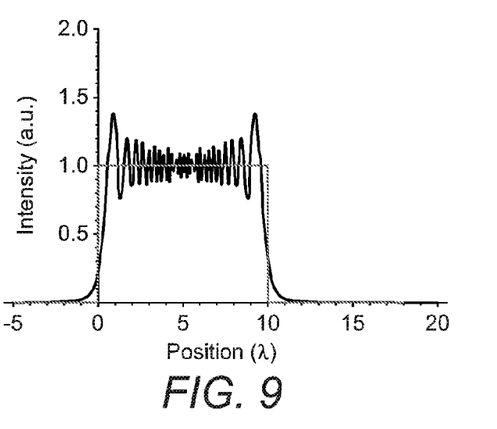
FIG. 9 illustrates approximation of the diffraction pattern as a rectangular function.

At small observation distances z the pattern can be approximately a rectangular box function (see FIG. 9). This approximation is justified because the error, i.e. the difference between the observed I(x) from a rectangular function is an oscillatory function having an integral close to zero under conditions to be determined below.

If I(x)=rect(W,x), then ∫I(x)dx=W and ∫xI(x)dx=$W^2/2$ allowing that as a first approximation the width of the observed pattern can be calculated by:

$$W = \frac{2\int xI(x)dx}{\int I(x)dx}. \quad (1.19)$$

Figure 10:
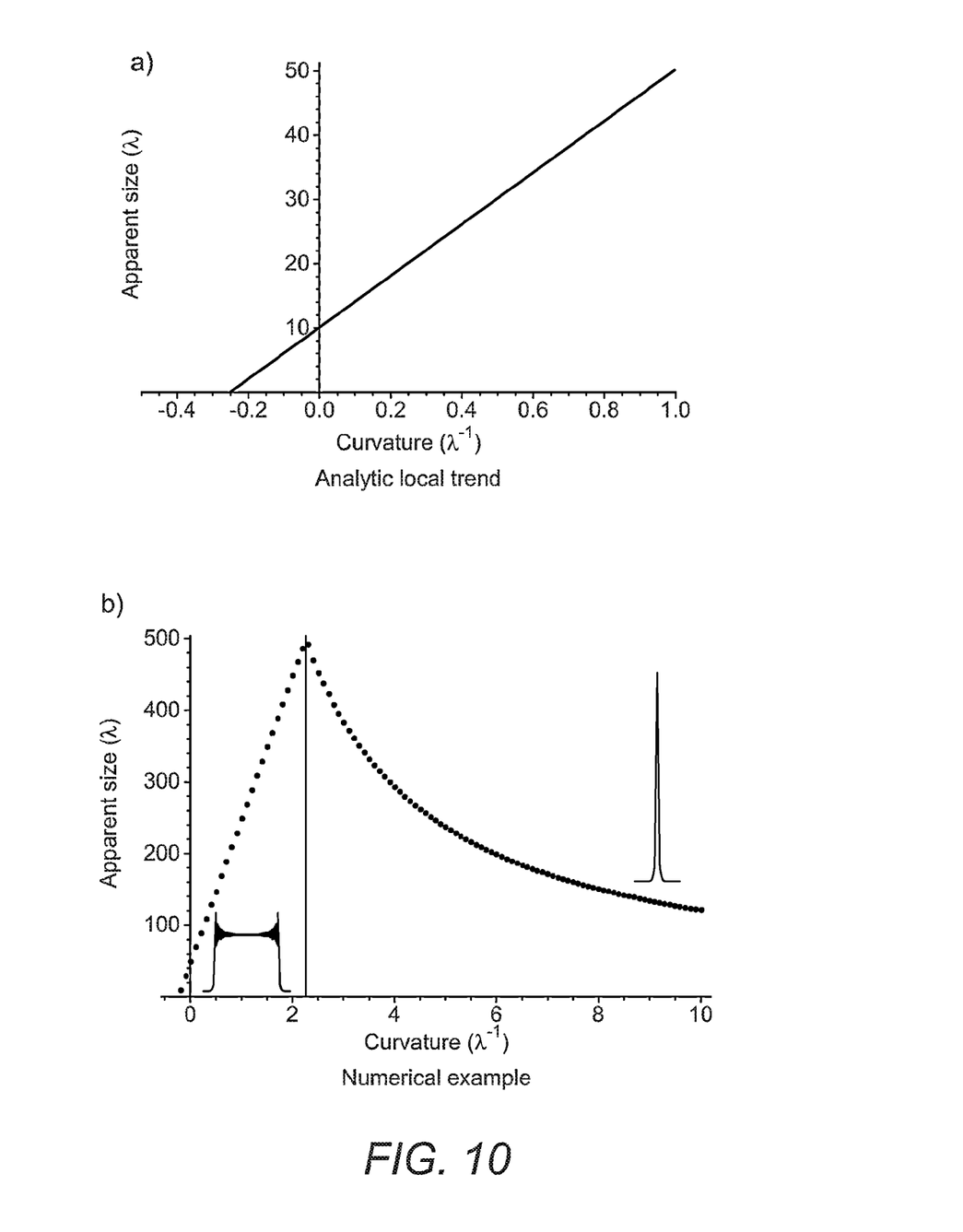
FIG. 10 is an exemplary illustration of pattern width as a function of cantilever curvature parameter b.

Those skilled in the art will appreciate that this calculation can be implemented by numerical analysis for a digital image. The calculated curve for W as a function of the curvature parameter b is shown in FIG. 10. Notice in a) that the apparent size goes to zero when b=−¼z and that in b) the response is linear over a broad range of value where the approximation is valid. The approximation is no longer valid outside of the linear region, where the pattern deviates substantially from a box shape.

A4 Exemplary Implementations

Rather than placing a detector at the short distances required for Fresnel diffraction, measurement can be facilitated by using a lens to form an image of the intensity distribution formed at a distance z from the cantilever.

FIG. 2, also discussed above, shows examples of images at z=0 or "focused cantilevers" and z>0 or "out-of-focus" cantilevers. As shown, the curvature of the cantilever generates a significant change in the size of the observed pattern, as seen in FIG. 2(d).

The curvature parameter b can be measured in various ways.

As discussed above with reference to FIG. 3, in some implementations, an image of the out-of-focus cantilever is acquired and the apparent length of the image is compared with the length of a stiff and straight cantilever with zero curvature. The length of a zero curvature cantilever may be known from design, e.g: the cantilever may be manufactured by photolithography to have particular dimensions. The ratio between the apparent length of the image and the length of a straight cantilever provides an experimental value for the scaling factor S and from this, the curvature parameter b can be calculated since z is known.

Alternatively, the apparent size of the curved cantilever may be compared with the apparent size of another flat cantilever of the same dimensions, if a flat cantilever is available in the array under measurement. Since the value of the scaling factor S for a flat cantilever is 1 (since b is 0), an experimental value for S can be determined from the ratio of sizes. Once a value for S is measured, the curvature parameter b can be calculated from the known value of z.

Further alternatively, in embodiments the apparent size of the unfocused image may be compared to the apparent size of a focussed image of the same cantilever. The value of S is 1 for a focussed image since z=0, and therefore the size of the unfocused pattern corresponds to the size of a focused image amplified by the scaling factor S=1+4bz. Then the change of b or z are indistinguishable and to measure b we can keep z constant at a known value. Thus, in some embodiments there is no need to have any a-priori information regarding the dimensions of the cantilever when flat. Furthermore, there is no need to calibrate the detector against physical size, so for example step 1 of FIG. 3 may be omitted.

Further alternatively, in embodiments, z may be varied (e.g: by moving the cantilever array) and an experimental value for the scaling factor S may be determined at a plurality of different z values. By for example plotting the curve of S against z, a value for b can be determined.

The cantilever tilt may also be measured by observing the shift of position of the image (see A2.1) at different values of z.

A5. Crosstalk

Figure 11:
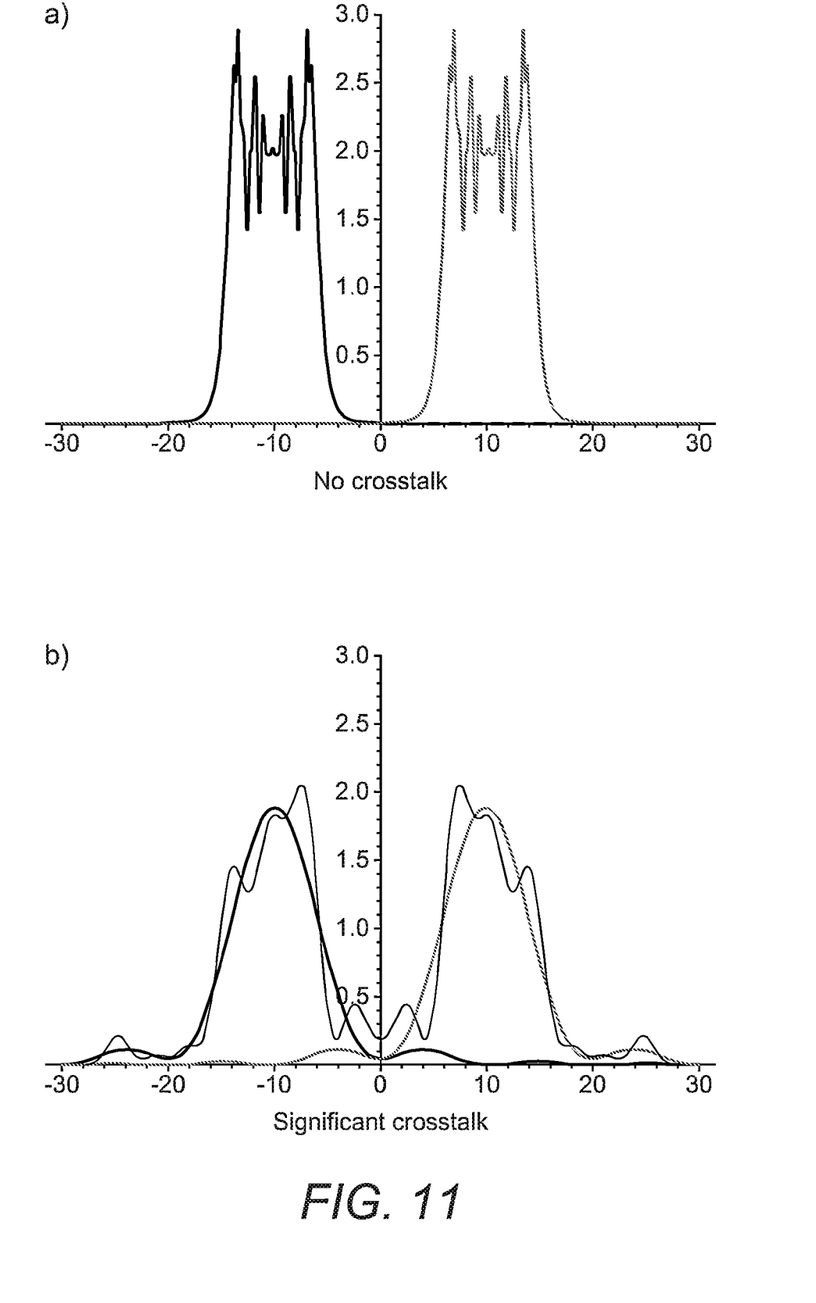
FIG. 11 shows an example of neighbouring patterns without significant overlap (a) and an example with overlap (b)

Preferably, to measure absolute bending there should not be significant overlap of the images from different cantilevers. Overlap between images is undesirable as it increases measurement error. FIG. 11 shows an example of neighbouring patterns without significant overlap (a) and an example with overlap (b).

A6. Dimensionless Form

We can define the following dimensionless variables:
(1.20)

$$W = \sqrt{\frac{1+4bz}{z\lambda}}\,w;$$

Figure 12:
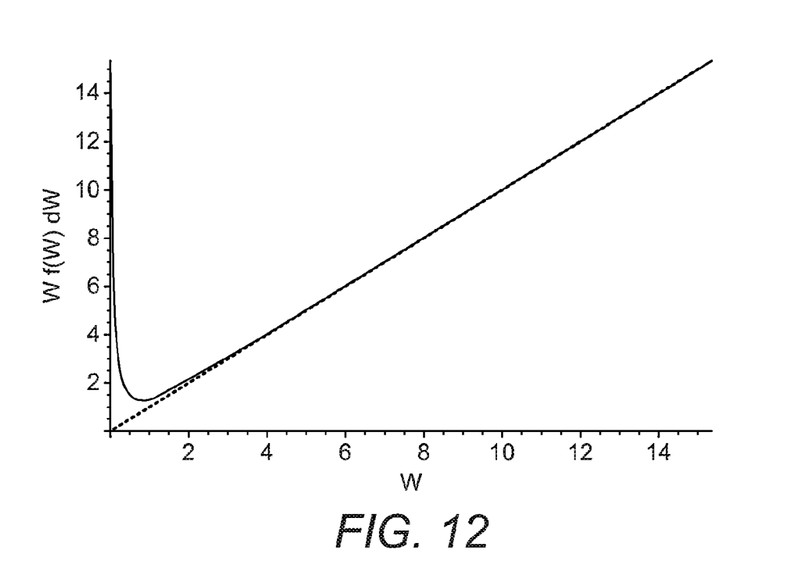
FIG. 12 is a plot of the figure of merit as a function of a dimensionless parameter W related to the ratio of the width and the wavelength and z.

-continued $$X = \frac{x - 2a\sqrt{z}}{\sqrt{\lambda(1 + 4bz)}}$$

and the solution of section A2 remains the same but now with
$\alpha_i = \sqrt{2}(W_i - X)$. FIG. 12 shows a numerical calculation of the width for a range of values of W. We see that the dimensionless width of the pattern is linear within 1% for W>2 corresponding to the conditions for near field diffraction. For zero curvature, this criteria is similar to the Fresnel number inequality $$F = \frac{w^2}{z\lambda} \geq 1$$

for near field diffraction.

This allows us to define two exemplary constraints, $W_x > 2$ along the cantilever so the figure of interest is linear with curvature parameter b, and $W_x > 1$ across the width of the cantilever so the pattern is constrained to a small region to avoid crosstalk.

By way of example, the following table provides maximum values of z and curvature resolution for difference cantilever lengths, assuming a wavelength of 660 nm and $N_{px}$=1280 pixels (1.3 Mega-pixel camera).

| Cantilever Length [μm] | Max. Obs. Distance [mm] | Curvature resolution [m⁻¹] |
|---|---|---|
| 50 | 0.9 | 0.2056 |
| 100 | 3.8 | 0.0514 |
| 150 | 8.5 | 0.0228 |
| 200 | 15.2 | 0.0129 |
| 250 | 23.7 | 0.0082 |
| 500 | 95 | 0.0021 |

A7. Detector

The dimensions of the detector affect resolution of the system. Because the measure of the curvature parameter b is the ratio between patterns that must fully fit within the sensitive area of the detector, if the detector has $N_{px}$ pixels along the x axis, the biggest images is $N_{px}$ pixel. The resolution is at least the inverse of the number of pixels in the image, ie: if a pattern of N pixels reduces its size by one pixel, then the curvature parameter b is given by 1+4bz=(N−1)/N or $b=-(4Nz)^{-1}$. So the maximum resolution is obtained with $b=-(4Nz)^{-1}$.

A8. Example

For a rectangular cantilever of 500 microns length and 100 microns width, an illumination wavelength of 658 nm and a detector with 1280 pixels in the longest axis, the requirement of $W_x \geq 2$ implies that z≤12.6 mm and a resolution of around 3.8 nm. Better resolution could be achieved by optimizing the geometrical parameters or by relaxing the linearity requirements.

Many modifications and variations of the embodiments described above are possible.

For example, although the curvature may be measured by measuring curvature parameter b, alternatively, or in addition, other parameters relating to the curvature may be measured. For example, by analysing the gradient of the intensity profile of the image (ie: how much the intensity profile changes from one point to the next), higher order polynomial terms describing variation of the curvature along the cantilever may be determined.

Figure 13:
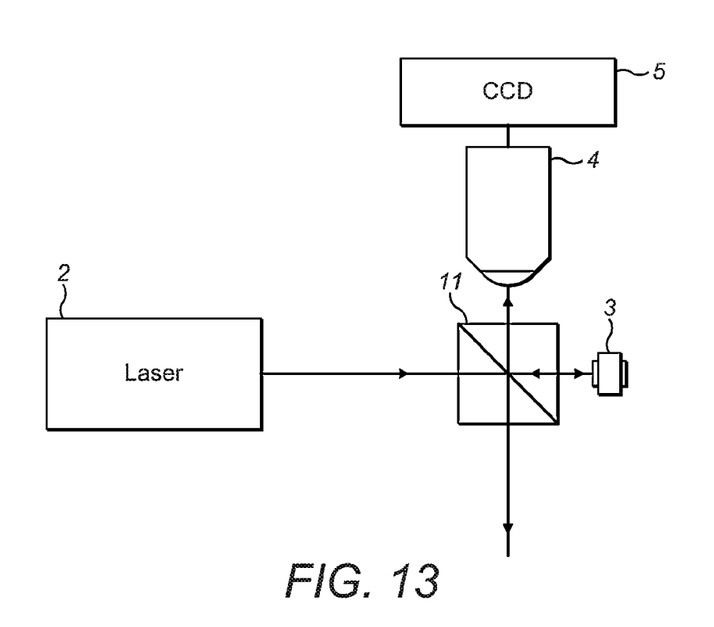
FIG. 13 illustrates an alternative apparatus for measuring surface curvature.

Alternative optical arrangements are also possible. FIG. 13 shows one possible alternative arrangement, in which a beamsplitter 11 is provided in the path of the laser beam so as to permit laser light to illuminate the sample 3, and to direct part of the light reflected from the sample to the lens 4 and detector 5. In this example, reflection from the sample is at normal incidence, which facilitates alignment.

In embodiments, the entire cantilever array is illuminated and imaged. To facilitate simultaneous measurement of multiple cantilevers in an array, the spatial intensity profile of the laser beam in a plane transverse to the beam propagation may be made substantially flat in a central region of the beam.

However, alternatively only a part of the array may be illuminated. In some embodiments, an individual cantilever may be illuminated and its curvature measured.

The cantilevers in the array may be attached (tethered) to one end of a chip or substrate. However, in embodiments the cantilevers are not fixed in an array and are untethered, e.g. floating in a static solution or carried in a flow.

The cantilevers may have a generally rectangular shape when flat. However, in general, the cantilever can have an arbitrary shape.

Although measurement of the curvature of a cantilever at a single point in time is discussed above, alternatively the measurement procedure may be performed repeatedly at intervals. Typical values for the frame rate may be between 25 to 60 frames per second, giving a period in the range of 15 to 40 ms. However, the frame rate may be as small as necessary. In embodiment using specialised cameras, the frame rate may be as high as 1000 frames per second, giving a period of 1 ms. Thus, in embodiments, the curvature of a cantilever as a function of time may be determined.

To resolve fast oscillatory motion, frames can be captured using stroboscopic illumination. In this mode the illumination is modulated over time in a rectangular pulse, where the illumination is on around 7% of the time and off the remaining 93% in cycles with frequency set based on the oscillation of the cantilever. The fast movement of the cantilever can then be observed slowed down by the stroboscopic or "wagon-wheel" effect. Furthermore, the observed slowed down motion can be fed back to a control system to lock-in the illumination frequency and obtain a static motion when the modulated illumination has the same frequency as the motion of the cantilever. In this locked-in mode, the variations in the illumination frequency are a measurement of the oscillation frequency of the cantilever.

Although curvature measurement has been discussed above in the context of measuring the curvature of the surface of a cantilever, alternatively the curvature of surfaces of other objects could be measured, e.g: other microstructures such as untethered micro-plates.

The formulae presented have been evaluated for curvature along one dimension, but they can be implemented for two dimensional curvature. In particular, curvature along the y axis of a rectangular cantilever will also result in an expansion of the image on the detector. More generally, those skilled in the art cognizant of the present disclosure will appreciate that the full curvature tensor for a surface can be estimated by defocusing methods and apparatus according to embodiments of the present invention.

Embodiments of the present invention can be applied for example to atomic force microscopes, to systems for detecting the presence of absence of target substances in a fluid (e.g: biosensors) and to sensors or transducers of force, temperature or surface stress.

For example, an atomic force microscope may be provided comprising a cantilever having a tip, the cantilever being configured to deform as the tip is scanned across a sample. An apparatus according to any one or more of the embodiments discussed above could be used to measure curvature of the cantilever, which in turn can yield useful information about the structure environment.

A multi-marker bio-chemical sensor comprising a cantilever array may be provided for use in disease diagnosis, drug screening, or simultaneous sensitive detection of various small concentrations of substances both in the liquid or gas phase. The bio-chemical sensor may include an apparatus according to any one or more of the embodiments discussed above and may be configured to simultaneously measure curvature of multiple cantilevers, thereby to achieve simultaneous sensitive detection of various small concentrations of substances both in the liquid or gas phase.

Other applications include using the cantilever array as a local probe for strain, pressure or temperature.

Apparatus according to various embodiments of the invention of this disclosure have the advantage of simpler design and manufacturing, and are resilient to small misalignments.

Many further modifications and variations will be evident to those skilled in the art, that fall within the scope of the following claims:

1. Method of measuring a curvature of a surface, comprising:
    illuminating the surface with electromagnetic radiation;
    reflecting the electromagnetic radiation from the surface;
    forming on a detector a defocused image of the surface, wherein the defocused image comprises an intensity distribution defined by Fresnel diffraction, wherein said intensity distribution is formed by the reflected electromagnetic radiation having been at least one of refracted by a lens or reflected off of a curved mirror positioned in the path of the reflected electromagnetic radiation at a distance from the detector sufficient to form the defocused image;
    obtaining data for the intensity distribution; and
    determining information relating to the curvature of the surface using the obtained data; wherein determining information relating to the curvature of the surface comprises:
        processing the obtained data to calculate a figure of merit indicative of the size of the intensity distribution in at least one dimension; and
        determining information relating to the curvature of the surface using the calculated figure of merit.

2. Method as claimed in claim 1, wherein determining information relating to the curvature of the surface further comprises determining an absolute value of a curvature parameter.

3. Method as claimed in claim 1, wherein determining information relating to the curvature of the surface further comprises:
    determining a scaling factor for the intensity distribution, and measuring the curvature of the surface by comparing the scaling factor with a predetermined formula.

4. Method as claimed in claim 1, wherein said surface is a surface of a cantilever.

5. Method as claimed in claim 4, wherein the cantilever has a length of 500 micron or less.

6. Method as claimed in claim 4, wherein said cantilever is one of a plurality of cantilevers, wherein the method comprises illuminating said plurality of cantilevers.

7. Method as claimed in claim 6, wherein the method comprises forming images for each cantilever, wherein there is no substantial overlap between images for each cantilever.

8. Method as claimed in claim 6, wherein the method comprises illuminating at least a part of an array of cantilevers comprising said plurality of cantilevers.

9. Method as claimed in claim 1, wherein the intensity distribution is a mapping of an intensity distribution formed at a distance z from the surface, wherein z is less than 100 mm.

10. Method as claimed in claim 1, further comprising determining information relating to the tilt of the surface using the obtained data.

11. Method as claimed in claim 1, further comprising:
    reflecting electromagnetic radiation from a second surface to form a second intensity distribution defined by Fresnel diffraction,
    wherein the formed defocused image further comprises said second intensity distribution;
    obtaining data for the second intensity distribution;
    determining information relating to the curvature of the second surface using the obtained data,
    wherein said intensity distribution and said second intensity distribution are formed concurrently and do not substantially overlap with one another.

12. Method as claimed in claim 11, comprising:
    forming a first diffraction image, wherein said first diffraction image is formed by the electromagnetic radiation which has been reflected from the first surface;
    forming a second diffraction image, wherein said second diffraction image is formed by the electromagnetic radiation which has been reflected from the second surface, wherein the first and second diffraction images are formed concurrently;
    obtaining data for the first and second diffraction images;
    determining information relating to the curvature of the first and second surfaces using the obtained data,
    wherein the first and second diffraction images do not substantially overlap with one another.

13. A method according to claim 12, wherein the first surface is a surface of a first cantilever, and the second surface is a surface of second cantilever.

14. A method as claimed in claim 13, wherein the first and second cantilevers are individual members of a cantilever array.

15. A method as claimed in claim 14, comprising forming a defocused focus image of the array, wherein the defocused image of the array includes the first diffraction image and the second diffraction image.

16. Method according to claim 11, wherein obtaining data for the first and second intensity distributions comprises:
    identifying a plurality of regions in the defocused image, each region comprising a sub-image corresponding to a single one of said surfaces;
    calculating a figure of merit indicative of the size of each sub-image in at least one dimension; and wherein the method further comprises:
    determining information relating to the curvature of at least one surface using the figure of merit.

17. Method as claimed in claim 16, wherein identifying a plurality of regions in the image comprises:

processing the image data to align sub-images for each surface;

obtaining a histogram of intensity per pixel column; and identifying said plurality of regions using the histogram.

18. Apparatus for measuring the curvature of a non-planar surface, comprising:

an electromagnetic radiation source configured to reflect electromagnetic radiation off of the non-planar surface;

one or more lenses or curved mirrors positioned in the path of the reflected electromagnetic radiation and at a distance from the detector sufficient to form the defocused image to produce a defocused image of the non-planar surface;

a detector positioned to receive and obtain data regarding the defocused image, wherein the defocused image comprises an intensity distribution defined by Fresnel diffraction, and wherein the one or more lenses or curved mirrors are positioned in the path of the reflected electromagnetic radiation at a distance from the detector sufficient to form the defocused image of the non-planar surface; and a processor to determine information relating to the curvature of the surface using the obtained data.

19. Apparatus as claimed in claim 18, wherein the sample comprises:

a cantilever of an atomic force microscope.

20. The apparatus of claim 18, further configured to form, concurrently with the first intensity distribution, a second intensity distribution defined by Fresnel diffraction, wherein said second intensity distribution is formed by electromagnetic radiation reflected from a second surface;

wherein the formed defocused image further comprises said second intensity distribution;

wherein the detector is further configured to obtain image data for the second intensity distribution;

wherein the processor is further configured to determine information relating to the curvature of the first and second surfaces using the image data; and wherein the detector and the one or more lenses or curved mirrors are configured so that the first and second intensity distributions do not substantially overlap with one another.

21. The apparatus of claim 20, further comprising:

a sample comprising one or more target substances and a cantilever array having a plurality of cantilevers, each of said plurality of cantilevers being configured to change in curvature as a function of the concentration of one or more bio-chemical substances.

22. A system for detecting the presence of absence of a target substance in a fluid, comprising:

a sample comprising a surface in contact with the fluid and configured to change in curvature as a function of the presence or absence of said target substance;

an apparatus for measuring the curvature of the surface comprising:

an electromagnetic radiation source configured to reflect electromagnetic radiation off of the non-planar surface;

one or more lenses or curved mirrors positioned in the path of the reflected electromagnetic radiation and at a distance from the detector sufficient to form the defocused image to produce a defocused image of the non-planar surface;

a detector positioned to receive and obtain data regarding the defocused image, wherein the defocused image comprises an intensity distribution defined by Fresnel diffraction, and wherein the one or more lenses or curved mirrors are positioned in the path of the reflected electromagnetic radiation at a distance from the detector sufficient to form the defocused image of the non-planar surface; and a processor to determine information relating to the curvature of the surface using the obtained data.

23. A system comprising:

a surface configured to change in curvature as a function of at least one of force, temperature, strain, surface stress, or as a function of the presence of absence of a target substance or the concentration of one or more substances;

an apparatus for measuring the curvature of the surface comprising:

an electromagnetic radiation source configured to reflect electromagnetic radiation off of the non-planar surface;

one or more lenses or curved mirrors positioned in the path of the reflected electromagnetic radiation and at a distance from the detector sufficient to form the defocused image to produce a defocused image of the non-planar surface;

a detector positioned to receive and obtain data regarding the defocused image, wherein the defocused image comprises an intensity distribution defined by Fresnel diffraction, and wherein the one or more lenses or curved mirrors are positioned in the path of the reflected electromagnetic radiation at a distance from the detector sufficient to form the defocused image of the non-planar surface; and a processor to determine information relating to the curvature of the surface using the obtained data.

* * * * *